Oct. 6, 1959 K. H. BECK 2,907,955

OSCILLATOR OPERATING IN EITHER OF TWO MODES

Filed Aug. 30, 1957 2 Sheets-Sheet 1

HIGH FREQUENCY
EQUIVALENT CIRCUIT

INVENTOR.
KENNETH H. BECK

BY Arthur H. Swanson

ATTORNEY.

Oct. 6, 1959 K. H. BECK 2,907,955

OSCILLATOR OPERATING IN EITHER OF TWO MODES

Filed Aug. 30, 1957 2 Sheets-Sheet 2

INVENTOR.
KENNETH H. BECK
BY Arthur H. Swanson
ATTORNEY.

United States Patent Office 2,907,955

Patented Oct. 6, 1959

2,907,955

OSCILLATOR OPERATING IN EITHER OF TWO MODES

Kenneth H. Beck, Newtown, Pa., assignor to Minneapolis-Honeywell Regulator Company, Minneapolis, Minn., a corporation of Delaware Application August 30, 1957, Serial No. 681,409

15 Claims. (Cl. 331—177)

This invention pertains generally to electrical control apparatus. More specifically, the present invention pertains to that class of control apparatus in which means responsive to the condition being controlled are employed to control a variable element in an oscillator circuit and thereby the oscillator operation.

A general object of the present invention is to provide a new and improved oscillating type control apparatus.

A specific object of the present invention is to provide a new and improved oscillator which is adapted to oscillate in either of two modes.

Another specific object of the present invention is to provide a new and improved control apparatus in which an oscillator is adapted to oscillate in either of two modes having widely separated frequencies of operation.

Still another object of the present invention is to provide a new and improved control apparatus employing an oscillator adapted to oscillate at a low frequency as a phase shift oscillator and at a high frequency as a Colpitts oscillator.

Another object of the present invention is to provide a new and improved control apparatus of the oscillating type which is characterized by a mode of operation such that upon a failure, the controller will operate in such a manner that it will prevent the controlled variable from going in a direction which will cause the destruction of any apparatus associated therewith and signal such failure.

The various objects of the present invention are accomplished in an apparatus in which an inductor is connected in series with the phase shifting network of a phase shift oscillator, and a variable capacitor, responsive to the condition to be controlled, is connected between the anode of the vacuum tube employed as the oscillator amplifying element and ground. Minute changes in the capacitance of this capacitor are operative to cause this oscillator to oscillate either at a low frequency as a phase shift oscillator or at a high frequency as a Colpitts oscillator. A low pass filter is employed to couple the output of the oscillator to control means, thereby permitting the control means to discriminate between the two modes of oscillator operation.

A better understanding of the present invention may be had from the following description read with reference to the accompanying drawings, of which:

Figure 1:
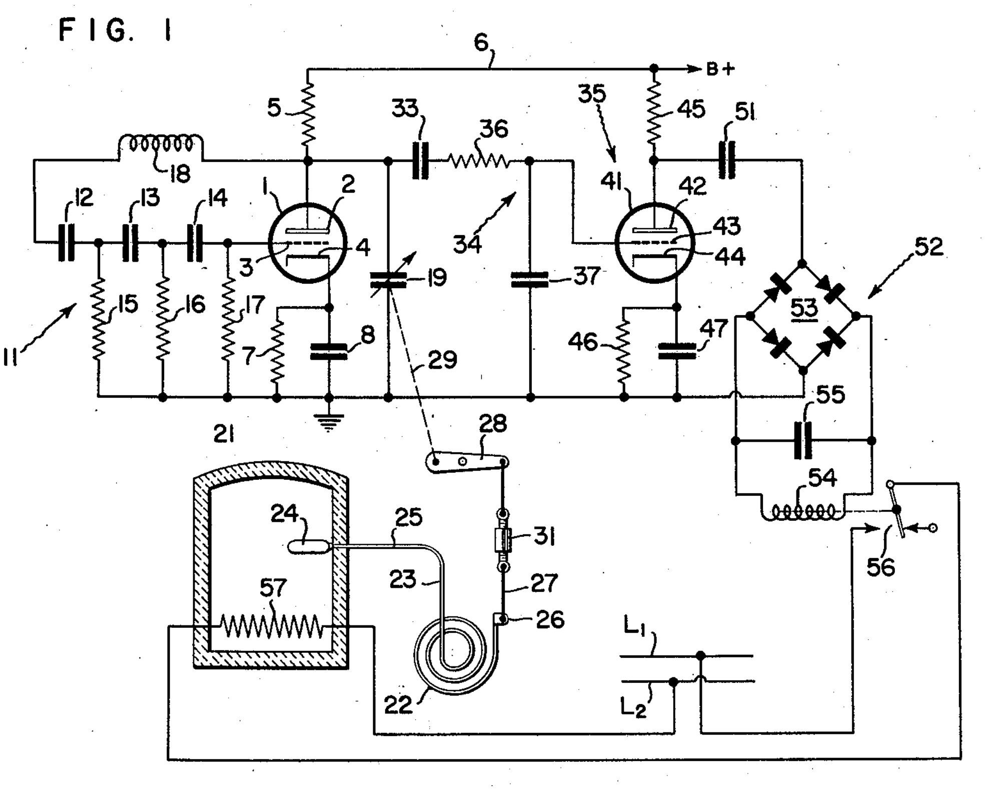
Fig. 1 is a circuit diagram of a preferred embodiment of the present invention.

Referring now to Fig. 1, the numeral 1 designates a vacuum tube having an anode 2, a control grid 3, and a cathode 4. As shown, the anode 2 of the vacuum tube 1 is adapted to be connected to a source of energizing voltage by means of a resistor 5 and the conductor 6. The cathode 4 of the vacuum tube 1 is connected by means of a resistor 7, which is bypassed by a capacitor 8, to ground. A phase shifting network 11 is connected between the control grid 3 of the vacuum tube 1 and ground. The phase shifting network 11 is a three section R-C ladder network comprising the capacitors 12, 13, and 14 and the resistors 15, 16, and 17. An inductor 18 connects the phase shifting network 11 to the anode 2 of the vacuum tube 1 completing the positive feedback loop which includes the phase shifting network 11 and the inductor 18. A variable capacitor 19 is connected between the anode 2 of the vacuum tube 1 and ground.

In the embodiment of the present invention shown in Fig. 1, the capacitance of the capacitor 19 is varied in accordance with variations in the temperature of a furnace 21 by means including a Bourdon tube 22 of spiral form. The Bourdon tube 22 has a stationary end 23 to which the fluid pressure in a thermometer bulb 24 is transmitted by a tube 25. A movable end 26 of the Bourdon tube 22 is mechanically connected through a link 27, crank arm 28, and a linkage 29 to the variable capacitor 19. As shown, the link 27 is made adjustable in length by the inclusion of a turnbuckle 31. As the temperature in the furnace 21 rises and falls, the fluid pressure in the bulb 24 increases and decreases to respectively decrease and increase the capacitance of the capacitor 19.

The output of the oscillator is coupled by means of a coupling capacitor 33 and a low pass filter 34 to the input of an amplifier 35. The low pass filter 34 comprises a resistor 36 and a capacitor 37. The amplifier 35 employs a vacuum tube 41 as its amplifying element. The vacuum tube 41 has an anode 42, control grid 43, and a cathode 44. As shown, a resistor 45 connects the anode 42 of the vacuum tube 41 to a source of energizing voltage. The cathode 44 of the vacuum tube 41 is connected to ground by means of a resistor 46 which is by-passed by a capacitor 47.

The output of the amplifier 35 is coupled, by means of a capacitor 51, to a relay circuit 52. The relay circuit 52 includes a full wave bridge rectifier 53, the input of which is connected between the capacitor 51 and ground. A relay 54 and a capacitor 55 are connected in parallel across the output terminal of the bridge rectifier 53. The relay 54 has a pair of contacts 56 which are connected in series with a heating element 57 of the furnace 1 and a suitable source of electric power, diagrammatically represented as the conductors $L_1$ and $L_2$. The relay 54 is thus operative to control the heating of the furnace 1.

The oscillator of Fig. 1 consists of a phase shift oscillator with the inductor 18 added in the feedback loop, and a variable control capacitor connected between the plate of the vacuum tube 1 and ground. This circuit is designed to oscillate in either of two modes, at low frequency as a phase shift oscillator, and at a high frequency as a Colpitts oscillator, under the control of the variable capacitor 19. When operating as a phase shift oscillator, the sections of the ladder network are operative to provide a total phase shift of 180° for the signal appearing at the anode 2 of the vacuum tube 1. To operate as a phase shift oscillator, the gain of the vacuum tube 1 must be sufficient to overcome the voltage loss in the phase shifting network 11 so that a signal of sufficient magnitude to sustain oscillations may be provided at the control grid 3.

Figure 2:
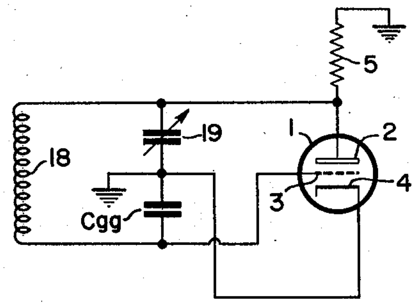
Fig. 2 is a high frequency equivalent circuit of the oscillator employed in the embodiment of the present invention shown in Fig. 1.

Considering the inter-electrode capacities of the vacuum tube 1, the equivalent circuit of the oscillator of Fig. 1 at very high frequencies is illustrated in Fig. 2. It should be noted that at high frequencies the oscillator of Fig. 1 has the form of a Colpitts oscillator if the plate to ground capacity and the grid to ground capacity are properly proportioned. In practice, trimmer capacitors may be added to properly proportion the parameters of the vacuum tube employed where necessary. As shown, in this high frequency mode of operation the cathode capacitor 8 approximates a short circuit and the cathode 4 is essentially connected to ground. Likewise, the capacitors 12, 13, and 14 approximate short circuits and the inductor 18 is directly connected between the anode 2 and the control grid 3 of the vacuum tube 1. In this mode of oscillation, if the capacitance of the capacitor 19 is increased sufficiently, the condition for oscillation at a high frequency as a Colpitts circuit will be destroyed. When the circuit is oscillating in a high frequency mode, the vacuum tube 1 is driven into the grid current region and the amplification factor of the tube is lowered beyond the point where the tube gain is sufficient to produce low frequency oscillations controlled by the phase shifting network 11. When the plate to ground capacity is increased to the point where high frequency oscillation stops, the grid stops drawing current and the normal D.C. bias of the tube, provided by the cathode resistor 7, is such that sufficient gain is obtained for the low frequency oscillation to start.

By proper design, the frequency of oscillation in the circuit of Fig. 1 in the high frequency mode of operation may be made extremely high and thus a very small change in capacity between plate and ground is sufficient to stop or start oscillation in this mode. In addition, the frequency difference between the low and high frequency modes of oscillation can be made so great that a simple R-C low pass filter is sufficient to remove the high frequency signal from the oscillator output. Thus, a low frequency signal of fairly large magnitude may be controlled by a very small change in the capacitance of the capacitor 19 connected between the plate of the vacuum tube 1 and ground. By proper design, the circuit of Fig. 1 can be adapted to switch from one mode of oscillation to the other with a capacitance change on the order of 10 micromicrofarads or less.

According to the present invention, the low frequency signal produced by the circuit of Fig. 1, when oscillating as a phase shift oscillator, is further amplified and used to control the operation of the relay 54 which, in turn, is shown employed to control the operation of the furnace 21. Due to the low pass filter 34, substantially no signal is applied to the control grid 43 of the vacuum tube 41 when the furnace temperature is high and the oscillator is oscillating in the high frequency or Colpitts mode. However, when the temperature of the furnace 21 decreases sufficiently, the thermometer bulb 24, Bourbon tube 22, the linkage 27, crank 28, and linkage 29 will operate to increase the capacitance of the capacitor 19, causing the oscillator to stop oscillating at a high frequency and to oscillate at a low frequency in the phase shift mode of operation. The frequency of these low frequency oscillations is such as to be passed by the low pass filter 34 and is amplified by the amplifier 35 to energize the relay 54 which, in turn, energizes the heating element 57 by connecting it to the conductors $L_1$ and $L_2$.

Figure 3:
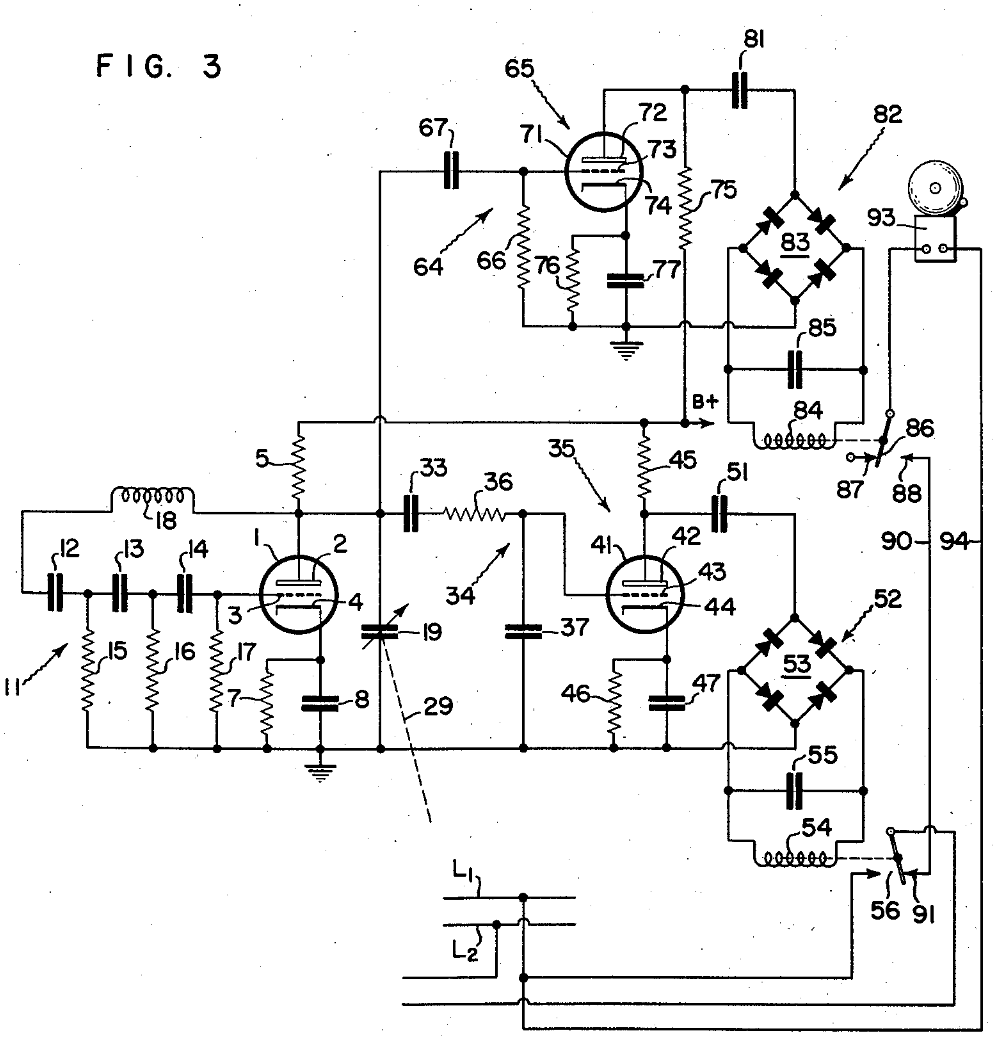
Fig. 3 is a modification of the embodiment of the present invention which is adapted to signal its own failure.

The fact that the control apparatus of Fig. 1 is adapted to switch quickly between either of two modes of oscillation rather than between oscillation and non-oscillation, as in prior art controllers, makes it adaptable to provide safe-failure operation and adaptable to signal its own failure. Referring now to Fig. 3, there is shown a modification of the present invention which is adapted to energize an alarm means upon failure. Similar reference characters have been employed to designate components similar to those shown in Fig. 1. Since the operation of these components has already been described, this description will not be repeated. As shown, the output of the oscillator, in addition to being coupled by the low pass filter 34 to the input of the amplifier 35, is coupled by means of the high pass filter 64 to the input of an amplifier 65. The high pass filter 64 comprises a resistor 66 and a capacitor 67. The amplifier 65 employs a vacuum tube 71 as its amplifying element. The vacuum tube 71 has an anode 72, a control grid 73, and a cathode 74. As shown, a resistor 75 connects the anode 72 of the vacuum tube 71 to a source of energizing voltage. The cathode 74 of the vacuum tube 71 is connected to ground by means of a resistor 76 and a capacitor 77.

The output of the amplifier 65 is coupled, by means of a capacitor 81 to a relay circuit 82. The relay circuit 82 includes a full wave bridge rectifier 83, the input of which is connected between the capacitor 81 and ground. A relay 84 and a capacitor 85 are connected in parallel across the output terminals of the bridge rectifier 83. The relay 84 has a moving contact 86 which engages a stationary contact 87 when the relay 84 is energized and which engages the stationary contact 88 when the relay 84 is deenergized.

As shown, the stationary contact 88 of the relay 84 is connected by the conductor 90 to a back contact 91 on the relay 54. The back contact 91 on the relay 54 is engaged by the movable one of the contact pair 56 when the relay 54 is deenergized. The movable contact 86 of the relay 84 is connected by means of the conductor 92 to an alarm means, shown here as a bell 93. The bell 93 is connected to the conductor $L_1$ by means of the conductor 94.

In considering the operation of the circuit shown in Fig. 3, it should be noted that the relay 54 is deenergized when the oscillator is oscillating in its high frequency mode and is energized when the oscillator is oscillating in its low frequency mode. When the relay 54 is deenergized, the movable one of the contact pair 56 engages the contact 91. As can be seen from the drawing of Fig. 3, when the movable one of the contact pair 56 engages the contact 91, it is operative to energize the alarm 93 if the relay 84 is deenergized and its movable contact 86 engages the contact 88. Due to the action of the high pass filter 54, substantially no signal is applied to the control grid 73 of the vacuum tube 71 when the oscillator is oscillating in its low frequency or phase shift mode. When, however, the oscillator in its high frequency or Colpitts mode, the frequencies of these oscillations are such as to be passed by the high pass filter 64 and amplified by the amplifier 65 to energize the relay 84. When the relay 84 is energized, the movable contact 86 engages the stationary contact 87 and the alarm 93 is not energized. Thus, if the controller of Fig. 3 is operating in its normal manner, it will switch from one mode of oscillation to the other mode of oscillation depending upon the capacitance of the variable capacitor 19 and the alarm means 93 will never be energized. However, should the oscillator fail to oscillate in its high frequency mode indicating a failure of one of its components, the relay 84 will be deenergized at the same time that the relay 54 is deenergized and the alarm means 93 will be energized.

As is inherent in all controllers which are adapted to perform a control function in response to an alternating control signal, the controllers of Fig. 1 and Fig. 3 are both adapted to fail with the relay 54 in its deenergized condition upon the failure of any component which causes the loss of the alternating control signal. The controller of Fig. 3, however, is further adapted to signal its own failure by the utilization of its high frequency mode of oscillation to prevent the energization of an alarm means when it is functioning in the proper manner.

It will be noted that because the controller of the present invention oscillates in two modes as opposed to the type of controller which either oscillates or does not oscillate, it is capable of producing an alternating current control signal which can be readily amplified. This eliminates the need for a D.C. amplifier or the addition of a D.C. to A.C. converter as is necessary in controllers which have a direct current output in their non-oscillating condition. Still further, it will be apparent to those skilled in the art that the oscillator of the present invention is adapted for uses other than that of a controller. Thus, this oscillator provides a ready source of oscillation in two distinct and widely separate frequencies under the control of a single variable element.

Having now described the present invention, that which is claimed as new and is desired to secure by Letters Patent is:

1. An electrical controller comprising, in combination, an oscillator circuit including components and a variable element for causing said circuit to oscillate in one mode characterized by a first oscillation frequency when the value of said elements differs from a critical value, and for causing said circuit to switch abruptly to and oscillate in a different mode characterized by a substantially different oscillation frequency when the value of said element is varied at any rate to said critical value, means responsive to a condition for controlling the variation of said variable element, and control means connected to said oscillator and responsive to only one of said modes of oscillation.

2. An electrical controller comprising, in combination, an oscillator circuit including components and a variable element for causing said circuit to oscillate in one mode characterized by a first oscillation frequency when the value of said element differs from a critical value, and for causing said circuit to switch abruptly to and oscillate in a different mode characterized by a substantially different oscillation frequency when the value of said element is varied at any rate to said critical value, means responsive to a condition for controlling the variation of said variable element, and control means connected to said oscillator and responsive to only one of said modes of oscillation.

3. An electrical controller comprising, in combination, an oscillator circuit including components and a variable element for causing said circuit to oscillate in one mode characterized by a first oscillation frequency when the value of said element differs from a critical value, and for causing said circuit to switch abruptly to and oscillate in a different mode characterized by a substantially different oscillation frequency when the value of said element is varied at any rate to said critical value, means responsive to the condition to be controlled for controlling the variation of said variable element, control means adapted to be energized by the output of said oscillator, and means connecting said control means to said oscillator to prevent oscillations of one of said two frequencies from energizing said control means.

4. An oscillator adapted to operate in either of two modes comprising, in combination, a vacuum tube having an anode, a cathode and a grid, a resistor, by-passed by a capacitor, connecting said cathode to ground, a resistor adapted to connect said anode to a source of energizing voltage, a phase shifting network connected between said grid and ground, an inductor connecting said anode to said phase shifting network, and a variable capacitor connecting said anode to ground, said variable capacitor controlling in which of said two modes said oscillator will oscillate.

5. Apparatus as specified in claim 4 wherein said phase shifting network comprises a three section resistor-capacitor ladder network.

6. An oscillator adapted to oscillate at a low frequency as a phase shift oscillator and at a high frequency as a Colpitts oscillator comprising, in combination, an amplifying device having an input electrode, an output electrode and an electrode common to both its input and output, a resistor adapted to connect said output electrode to a source of energizing voltage, a resistor, by-passed by a capacitor, adapted to connect said output electrode to ground, an inductor and an R-C ladder phase shift network connected in series between the output and input of said amplifying device, and a variable capacitor connected between said output electrode and ground, said variable capacitor controlling whether said oscillator oscillates as a phase shift oscillator or a Colpitts oscillator.

7. An electrical controller comprising, in combination, an oscillator adapted to oscillate in either of two modes comprising a vacuum tube having an anode, a cathode and a grid, a resistor, by-passed by a capacitor, connecting said cathode to ground, a resistor adapted to connect said anode to a source of energizing voltage, a phase shifting network connected between said grid and ground, an inductor connecting said anode to said phase shifting network, and a variable capacitor connecting said anode to ground, said variable capacitor controlling in which of said two modes said oscillator will oscillate, means responsive to the condition being controlled for controlling the variations of said variable capacitor, and control means connected to said oscillator and responsive to only one of said modes of oscillation.

8. An electrical controller comprising, in combination, an oscillator adapted to oscillate at a low frequency as a phase shift oscillator and at a high frequency as a Colpitts oscillator comprising, in combination, an amplifying device having an input electrode, an output electrode and an electrode common to both its input and output, a resistor adapted to connect said output electrode to a source of energizing voltage, a resistor, by-passed by a capacitor, adapted to connect said output electrode to ground, an inductor and an R-C ladder phase shift network connected in series between the output and input of said amplifying device, and a variable capacitor connected between said output electrode and ground, said variable capacitor controlling whether said oscillator oscillates as a phase shift oscillator or a Colpitts oscillator, means responsive to the condition to be controlled for controlling the variation of said variable capacitor, control means adapted to be energized by the output of said oscillator and a low pass filter connecting said oscillator to said control means.

9. An electrical controller comprising, in combination, an oscillator circuit including components and a variable element for causing said circuit to oscillate in one mode characterized by a first oscillation frequency when the value of said element differs from a critical value, and for causing said circuit to switch abruptly to and oscillate in a different mode characterized by a substantially different oscillation frequency when the value of said element is varied at any rate to said critical value, means responsive to a condition for controlling the variation of said variable element, control means connected to said oscillator and responsive to only one of said modes of oscillation, and alarm means connected to said oscillator and adapted to be energized only if said oscillator fails to oscillate in the other of said two modes of oscillation.

10. An electrical controller comprising, in combination, an oscillator circuit including components and a variable element for causing said circuit to oscillate in one mode characterized by a first oscillation frequency when the value of said element differs from a critical value, and for causing said circuit to switch abruptly to and oscillate in a different mode characterized by a substantially different oscillation frequency when the value of said element is varied at any rate to said critical value, means responsive to the condition to be controlled for controlling the variation of said variable element, control means adapted to be energized by the output of said oscillator, means connecting said control means to said oscillator to prevent the oscillations of one of said two frequencies from energizing said control means, alarm actuating means, and means connecting said alarm actuating means to said oscillator to prevent the oscillations of the other of said two frequencies from energizing said alarm actuating means.

11. An electrical controller comprising, in combination, an oscillator adapted to oscillate either at a high frequency or at a low frequency, a variable control element for controlling at which of two frequencies said oscillator will oscillate, means responsive to the condition to be controlled for controlling the variations of said variable element, control means, a low-pass filter connecting said control means to said oscillator, alarm means, an alarm actuating means connected to said alarm means, a high-pass filter connecting said alarm actuating means to said oscillator, and means interconnecting said alarm actuating means and said control means to cause said alarm means to be actuated only when said oscillator fails to oscillate at either of said two frequencies.

12. An electrical controller comprising, in combination, an oscillator adapted to oscillate either at a high frequency as a Colpitts oscillator or at a low frequency as a phase shift oscillator, a variable control element for controlling at which of two frequencies said oscillator will oscillate, means responsive to the condition to be controlled for controlling the variations of said variable element, control means, a low-pass filter connecting said control means to said oscillator, an alarm means, alarm deenergizing means connected to said alarm means, and a high-pass filter connecting said alarm deenergizing means to said oscillator, said alarm means being actuated only when said oscillator fails to oscillate at either of said two frequencies.

13. An electrical controller comprising, in combination, an oscillator adapted to oscillate either at a high frequency or at a low frequency, a variable control element for controlling at which of two frequencies said oscillator will oscillate, means responsive to the condition to be controlled for controlling the variations of said variable element, control means, a low-pass filter connecting said control means to said oscillator for energization, an alarm, an alarm actuating means connected to said alarm, and a high-pass filter connecting said alarm actuating means to said oscillator for energization, and means interconnecting said alarm actuating means and said control means to prevent said alarm means from being actuated when said oscillator is oscillating at either of said two frequencies.

14. An electrical controller comprising, in combination, an oscillator adapted to oscillate at either of two widely separated frequencies, a variable element for controlling at which of said two frequencies said oscillator will oscillate, means responsive to the condition to be controlled for controlling the variation of said variable element, control means adapted to be energized by the output of said oscillator, and electrical filter means connecting said control means to said oscillator to prevent oscillations of one of said two frequencies from energizing said control means.

15. An electrical controller comprising, in combination, an oscillator adapted to oscillate at either of two widely separated frequencies, a variable element for controlling at which of said two frequencies said oscillator will oscillate, means responsive to the condition to be controlled for controlling the variation of said variable element, control means adapted to be energized by the output of said oscillator, and low pass filter means connecting said control means to said oscillator to prevent oscillations of one of said two frequencies from energizing said control means.

References Cited in the file of this patent

UNITED STATES PATENTS

| | | |
|---|---|---|
| 2,340,605 | MacLaren | Feb. 1, 1944 |
| 2,405,526 | Sinnett | Aug. 6, 1946 |
| 2,455,376 | Lindsay | Dec. 7, 1948 |
| 2,601,649 | Wadman | June 24, 1952 |